No. 877,465. PATENTED JAN. 21, 1908.
H. LUND.
CYLINDER WRENCH.
APPLICATION FILED MAY 31, 1905.
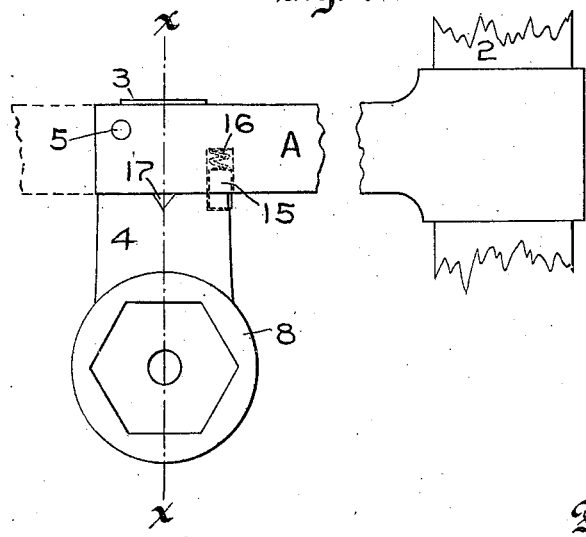
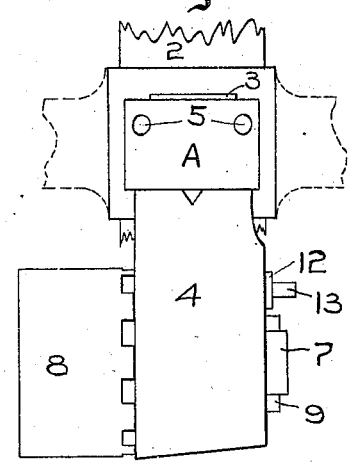
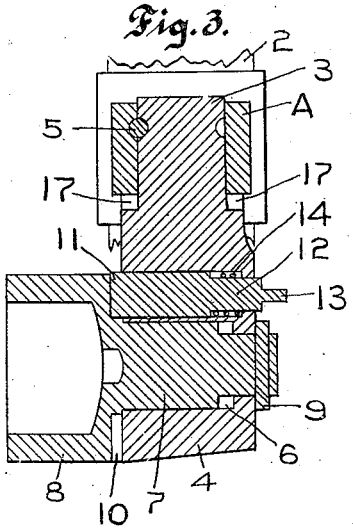
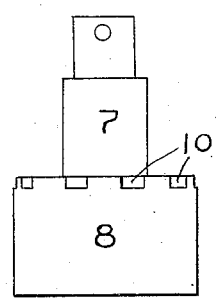
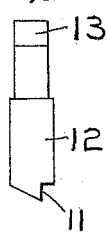
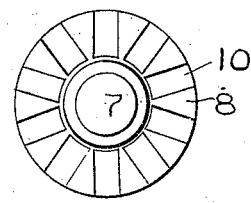
Witnesses:
W. H. Palmer
Emily F. Otis
Inventor:
Henry Lund.
by Lothrop & Johnson
his Attorneys.

UNITED STATES PATENT OFFICE.

HENRY LUND, OF GRAFTON, NORTH DAKOTA, ASSIGNOR, BY DIRECT AND MESNE ASSIGNMENTS, TO FOSSTON MANUFACTURING COMPANY, OF ST. PAUL, MINNESOTA, A CORPORATION OF MINNESOTA.

CYLINDER-WRENCH.

No. 877,465.　　　　Specification of Letters Patent.　　　　Patented Jan. 21, 1908.

Application filed May 31, 1905. Serial No. 263,019.

*To all whom it may concern:*

Be it known that I, HENRY LUND, a citizen of the United States, residing at Grafton, in the county of Walsh and State of North Dakota, have invented certain new and useful Improvements in Cylinder-Wrenches, of which the following is a specification.

My invention relates to improvements in wrenches, designed especially for use in connection with threshing cylinders to tighten and loosen the bolts which secure the cylinder teeth in place, and consists particularly in improvements in the wrench covered by U. S. Letters Patent No. 644,675, issued to me on March 6, 1900.

To this end my invention consists in the features of construction and combination hereinafter described and claimed.

In the accompanying drawings forming part of this specification, Figure 1 is a plan view of my improved wrench partly broken away; Fig. 2 is a side elevation of the same; Fig. 3 is a section on line $x$—$x$ of Fig. 1; Fig. 4 is a detail of the wrench-socket; Fig. 5 is a detail of a locking pin, and Fig. 6 is an end view of the wrench-socket.

In the drawings A represents a bar or rod provided at one end with a transversely extending handle 2 and at its other end with an opening through which extends the stem 3 of the wrench-head 4. The wrench-head is rotatable in the end of the bar and is secured against endwise displacement by a pin 5. The wrench-head projects at approximately a right angle to the bar A and is formed in its outer end with a transverse opening 6 to receive the stem 7 of the wrench-socket 8. The wrench-socket is adapted to rotate in said opening and is secured against endwise displacement by a pin 9. Said wrench-socket is provided around its inner edge with notches 10, with which is adapted to coöperate the toothed end 11 of the dog 12 slidably extending through the wrench-head parallel with the wrench-socket. The outer end 13 of the dog extends beyond the outer wall of the wrench-head as shown, and said dog is held in locking engagement with the wrench-socket by means of a surrounding coil spring 14. The dog 12 is rotatable so that the engaging side of the tooth 11 may be positioned to bear against either side of the teeth formed by the notches 10 to determine the direction of rotation of the wrench-socket. The projecting end 13 of the dog forms a finger-hold to permit its being turned.

To set the wrench-head in adjusted position I provide a detent 15 arranged in a socket in the end of the bar A and held forced outwardly by a spring 16, into one of the interspaced notches 17 in the adjacent edge of the wrench-head.

In operation the dog 12 will be turned to engage with the teeth of the wrench-socket from the desired side. By then oscillating the bar A, handle 2 and wrench-head the nut may be unscrewed. When it is desired to turn a nut in the opposite direction the dog should be turned to engage with the opposite sides of the wrench-socket teeth. By providing an actuating dog of the character shown the dog is forced outwardly by the teeth upon the wrench-socket so that when in extreme outward position it can be easily turned.

It will be evident that the construction and combination may be more or less modified without departing from my invention, the scope of which is defined in the claim.

Having now descibed my invention, what I claim as new, and desire to secure by Letters Patent, is:—

In a wrench, the combination with a bar, of a wrench-head pivoted to and projecting laterally therefrom, a nut socket rotatively supported in said wrench-head, rearwardly extending teeth circumferentially arranged upon the inner face of said socket, a reversible dog engaging with said teeth and provided with a spindle extending through said wrench-head parallel with said nut socket with its outer end projecting beyond the adjacent face of the wrench head, and a surrounding pressure spring for said dog, said spring being arranged within the wrench-head.

In testimony whereof I affix my signature in presence of two witnesses.

HENRY LUND.

Witnesses:
　H. S. JOHNSON,
　EMILY F. OTIS.